US009063986B2

(12) United States Patent
Sundaresan

(10) Patent No.: US 9,063,986 B2
(45) Date of Patent: *Jun. 23, 2015

(54) USING REPUTATION MEASURES TO IMPROVE SEARCH RELEVANCE

(71) Applicant: EBAY INC., San Jose, CA (US)

(72) Inventor: Neelakantan Sundaresan, Mountain View, CA (US)

(73) Assignee: eBay Inc., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/073,564

(22) Filed: Nov. 6, 2013

(65) Prior Publication Data

US 2014/0067785 A1 Mar. 6, 2014

Related U.S. Application Data

(63) Continuation of application No. 11/948,788, filed on Nov. 30, 2007, now Pat. No. 8,583,633.

(51) Int. Cl.
*G06F 17/30* (2006.01)
(52) U.S. Cl.
CPC ...... *G06F 17/3053* (2013.01); *G06F 17/30663* (2013.01)
(58) Field of Classification Search
CPC .............. G06F 17/30663; G06F 17/3053
USPC ......................... 707/706, 722, 758
See application file for complete search history.

(56) References Cited

U.S. PATENT DOCUMENTS

| 5,855,015 | A | 12/1998 | Shoham |
| 8,583,633 | B2 | 11/2013 | Sundaresan |
| 2002/0016786 | A1 | 2/2002 | Pitkow et al. |
| 2002/0103798 | A1 | 8/2002 | Abrol et al. |
| 2003/0033298 | A1* | 2/2003 | Sundaresan ...................... 707/5 |
| 2004/0015416 | A1* | 1/2004 | Foster et al. ................... 705/27 |

(Continued)

FOREIGN PATENT DOCUMENTS

| AU | 2008330082 B2 | 6/2009 |
| CA | 2706773 C | 7/2014 |

(Continued)

OTHER PUBLICATIONS

"U.S. Appl. No. 11/948,788, Final Office Action mailed Nov. 17, 2010", 15 pgs.

(Continued)

*Primary Examiner* — Shiow-Jy Fan
(74) *Attorney, Agent, or Firm* — Schwegman Lundberg & Woessner, P.A.

(57) ABSTRACT

A system and method for determining relevancy for dynamic data sets is disclosed. A specific embodiment for use in an internet marketplace is presented wherein the relevancy for a descriptive factor associated with an item is increased when a user selects that item. To prevent abuse of the relevancy determination system, various embodiments incorporate abuse prevention measures. In one embodiment, a user's selection of the user's own items does not affect the relevancy system. In one embodiment, only a first selection of a particular item by a user will affect the relevancy system and any additional selections of that item will have no effect. In another embodiment, the size of the changes made due to the selections of particular user to the relevancy system are correlated to that user's reputation score.

17 Claims, 6 Drawing Sheets

(56) References Cited

U.S. PATENT DOCUMENTS

| | | | |
|---|---|---|---|
| 2004/0068481 A1* | 4/2004 | Seshadri et al. | 707/1 |
| 2004/0068486 A1 | 4/2004 | Chidlovskii | |
| 2004/0169678 A1 | 9/2004 | Oliver | |
| 2006/0010117 A1 | 1/2006 | Bonabeau et al. | |
| 2007/0168344 A1 | 7/2007 | Brinson et al. | |
| 2007/0198500 A1* | 8/2007 | Lucovsky et al. | 707/4 |
| 2007/0200850 A1 | 8/2007 | Shah et al. | |
| 2007/0265803 A1 | 11/2007 | Kotsovinos et al. | |
| 2007/0266025 A1* | 11/2007 | Wagner et al. | 707/7 |
| 2007/0288602 A1* | 12/2007 | Sundaresan | 709/219 |
| 2008/0288481 A1* | 11/2008 | Zeng et al. | 707/5 |
| 2011/0231383 A1* | 9/2011 | Smyth et al. | 707/707 |

FOREIGN PATENT DOCUMENTS

| | | | |
|---|---|---|---|
| CN | 101884042 B | 7/2014 | |
| CN | 104111974 A | 10/2014 | |
| JP | 9190451 A | 7/1997 | |
| JP | 2008134800 A | 6/2008 | |
| WO | WO-2005101249 A1 | 10/2005 | |
| WO | WO-2007078033 A1 | 7/2007 | |
| WO | WO-2009070287 A1 | 6/2009 | |

OTHER PUBLICATIONS

"U.S. Appl. No. 11/948,788, Non-Final Office Action mailed Apr. 13, 2010", 15 pgs.
"U.S. Appl. No. 11/948,788, Notice of Allowance mailed Jul. 9, 2013", 8 pgs.
"U.S. Appl. No. 11/948,788, Notice of Allowance mailed Aug. 10, 2012", 8 pgs.
"U.S. Appl. No. 11/948,788, Response filed Mar. 7, 2011 to Final Office Action Mailed Nov. 17, 2010", 12 pgs.
"U.S. Appl. No. 11/948,788, Response filed Sep. 13, 2010 to Non Final Office Action mailed Apr. 13, 2010", 14 pgs.
"Australian Application Serial No. 2008330082, First Examiner Report mailed Feb. 18, 2011", 2 pgs.
"Australian Application Serial No. 2008330082, Response filed Nov. 18, 2011 to Examiner Report mailed Feb. 18, 2011", 13 pgs.
"Canadian Application Serial No. 2,706,773, Office Action mailed Jan. 21, 2014", 2 pgs.
"Canadian Application Serial No. 2,706,773, Office Action mailed May 7, 2012", 2 pgs.
"Canadian Application Serial No. 2,706,773, Response filed Jan. 30, 2014 to Office Action mailed Jan. 21, 2014", 6 pgs.
"Canadian Application Serial No. 2,856,645, Office Action mailed Sep. 26, 2014", 2 pgs.
"Chinese Application Serial No. 200880118613.8, Office Action mailed Jun. 1, 2012", with English translation of claims, 7 pgs.
"Chinese Application Serial No. 200880118613.8, Office Action mailed Jun. 24, 2013", with English translation of claims, 10 pgs.
"Chinese Application Serial No. 200880118613.8, Office Action mailed Oct. 10, 2011", w/ English translation, 6 pgs.
"Chinese Application Serial No. 200880118613.8, Office Action mailed Nov. 26, 2012", with English translation of claims, 11 pgs.
"Chinese Application Serial No. 200880118613.8, Office Action mailed Dec. 31, 2013", with English translation of claims, 6 pgs.
"Chinese Application Serial No. 200880118613.8, Office Action Response filed Feb. 27, 2012", w/ English Translation, 11 pgs.
"Chinese Application Serial No. 200880118613.8, Response filed Feb. 6, 2013 to Office Action mailed Nov. 26, 2012", with English translation of claims, 10 pgs.
"Chinese Application Serial No. 200880118613.8, Response filed Mar. 17, 2014 to Office Action mailed Dec. 31, 2013", with English translation of claims, 8 pgs.
"Chinese Application Serial No. 200880118613.8, Response filed Aug. 16, 2012 to Office Action mailed Jun. 1, 2012", with English translation of claims, 8 pgs.
"Chinese Application Serial No. 200880118613.8, Response filed Sep. 6, 2013", with English translation of claims, 10 pgs.
"European Application Serial No. 08855484.5, Amended Claims Response filed Jul. 22, 2010", 8 pgs.
"European Application Serial No. 08855484.5, EPO Written decision to refuse mailed Jan. 15, 2014", 13 pgs.
"European Application Serial No. 08855484.5, Extended European Search Report Apr. 8, 2011", 9 pgs.
"European Application Serial No. 08855484.5, Extended European Search Report Response Filed Oct. 20, 2011", 15 pgs.
"European Application Serial No. 08855484.5, Office Action mailed Apr. 12, 2013", 5 pgs.
"European Application Serial No. 08855484.5, Office Action mailed Dec. 6, 2013", 3 pgs.
"European Application Serial No. 08855484.5, Response filed Mar. 13, 2014 to Office Action mailed Jan. 15, 2014", 4 pgs.
"European Application Serial No. 08855484.5, Response filed May 26, 2014", 46 pgs.
"European Application Serial No. 08855484.5, Response filed Aug. 7, 2013 to Office Action mailed Apr. 12, 2013", 10 pgs.
"European Application Serial No. 08855484.5, Response filed Nov. 8, 2013 to Office Action mailed Sep. 12, 2013", 34 pgs.
"European Application Serial No. 08855484.5, Response filed Dec. 9, 2013 to Office Action mailed Dec. 6, 2013", 12 pgs.
"European Application Serial No. 08855484.5, Summons to Attend Oral Proceedings mailed Sep. 12, 2013", 7 pgs.
"International Application Serial No. PCT/US2008/013118, International Preliminary Report on Patentability mailed Jun. 10, 2010", 8 pgs.
"International Application Serial No. PCT/US2008/013118, Search Report mailed Jan. 15, 2009".
"International Application Serial No. PCT/US2008/013118, Written Opinion mailed Jan. 15, 2009".
"Japanese Application Serial No. 2010-535997, Notice of Allowance mailed Oct. 30, 2012", with English translation, 6 pgs.
"Japanese Application Serial No. 2010-535997, Office Action mailed Jun. 26, 2012", With English Translation, 6 pgs.
"Korean Application Serial No. 2010-7014547, Amendment filed Oct. 24, 2012", with English translation of claims, 7 pgs.
"Korean Application Serial No. 2010-7014547, Final Rejection mailed Jul. 26, 2012", with English translation of claims, 5 pgs.
"Korean Application Serial No. 2010-7014547, Response filed Feb. 3, 2012 to Office Action mailed Aug. 4, 2011", w/ English translation, 10 pgs.
"Republic of Korea Application Serial No. 2010-7014547, Office Action mailed Aug. 4, 2011", with English translation of claims, 10 pgs.
"Singapore Application Serial No. 201003327-2, Office Action mailed Nov. 12, 2010", 9 pgs.
"Singapore Application Serial No. 201003327-2, Response filed Jan. 10, 2012 to Written Opinion mailed Aug. 10, 2011", 6 pgs.
"Singapore Application Serial No. 201003327-2, Response filed Apr. 12, 2011 to Office Action mailed Nov. 12, 2010", 9 pgs.
"Singapore Application Serial No. 201003327-2, Office Action mailed Jul. 7, 2011", 6 pgs.
Ruthven, Ian, et al., "A survey on the use of relevance feedback for information access systems", The Knowledge Engineering Review, 18(2), (Jun. 2003), 95-145.
Salton, G., et al., "Improving Retrieval Performance by Relevance Feedback", Journal of American Society for Information Science, 41(4), (Jun. 4, 1990), 288-297.

* cited by examiner

US 9,063,986 B2

USING REPUTATION MEASURES TO IMPROVE SEARCH RELEVANCE

RELATED APPLICATIONS

This application is a continuation of U.S. patent application Ser. No. 11/948,788, filed on Nov. 30, 2007, which issued as U.S. Pat. No. 8,583,633, entitled "USING REPUTATION MEASURES TO IMPROVE SEARCH RELEVANCE," and is related to and incorporates reference U.S. patent application Ser. No. 11/679,973, filed on Feb. 28, 2007, entitled "DETERMINING RELEVANCY AND DESIRABILITY OF TERMS," which applications are incorporated herein by reference in their entirety.

TECHNICAL FIELD

The present invention relates to data retrieval. In particular, but not by way of limitation, the present invention discloses techniques for scoring the relevancy of items located in a computer search.

BACKGROUND

Computers are now used to store massive amounts of information. In order to locate particular information of interest, powerful and intuitive search mechanisms have been created.

For example, the World Wide Web portion of the Internet has grown exponentially since the late 1980's when the World Wide Web was first introduced. Early in the history of the World Wide Web, directories of web sites were used to guide users to web sites of interest. One of the most famous early web site directories was "Jerry's Guide to the World Wide Web" which was later renamed "Yahoo!". However, the rapid real-time growth of the Internet quickly made World Wide Web directories unmanageable and prone to being out of date. Internet search engines such as Lycos, Alta Vista, and Google became the new method finding web sites on the Internet. Internet search engines allow a user to enter a few keywords related to the topic of interest and return with a large set of search results that contain the keywords entered by the user.

Internet search engines operate by "crawling" the World Wide Web to learn about new web pages and then create a searchable index of all the web pages that were visited. When a user enters a set of keywords, the search engine returns a set of web pages that contain the keywords entered by the user. However, most queries entered by search engine users will map to thousands or even hundreds of thousands of results that contain the matching keywords. This information overload is not desired by the user. Thus, the real key to building a very good search engine is to sort the results by some type of relevancy measure. In this manner, the user of an internet search engine may quickly find desired content.

BRIEF DESCRIPTION OF THE DRAWINGS

In the drawings, which are not necessarily drawn to scale, like numerals describe substantially similar components throughout the several views. Like numerals having different letter suffixes represent different instances of substantially similar components. The drawings illustrate generally, by way of example, but not by way of limitation, various embodiments discussed in the present document.

DETAILED DESCRIPTION

The following detailed description includes references to the accompanying drawings, which form a part of the detailed description. The drawings show illustrations in accordance with example embodiments. These embodiments, which are also referred to herein as "examples," are described in enough detail to enable those skilled in the art to practice the invention. It will be apparent to one skilled in the art that specific details in the example embodiments are not required in order to practice the present invention. Although the example embodiments are mainly disclosed with reference to internet marketplace systems, the teachings can be used with other types of systems that incorporate a search engine. For example, social networking web sites or media presentation web sites may incorporate the teachings of the present invention. The example embodiments may be combined, other embodiments may be utilized, or structural, logical and electrical changes may be made without departing from the scope what is claimed. The following detailed description is, therefore, not to be taken in a limiting sense, and the scope is defined by the appended claims and their equivalents.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. Furthermore, all publications, patents, and patent documents referred to in this document are incorporated by reference herein in their entirety, as though individually incorporated by reference. In the event of inconsistent usages between this document and those documents so incorporated by reference, the usage in the incorporated reference(s) should be considered supplementary to that of this document; for irreconcilable inconsistencies, the usage in this document controls.

Computer Systems

Figure 1:
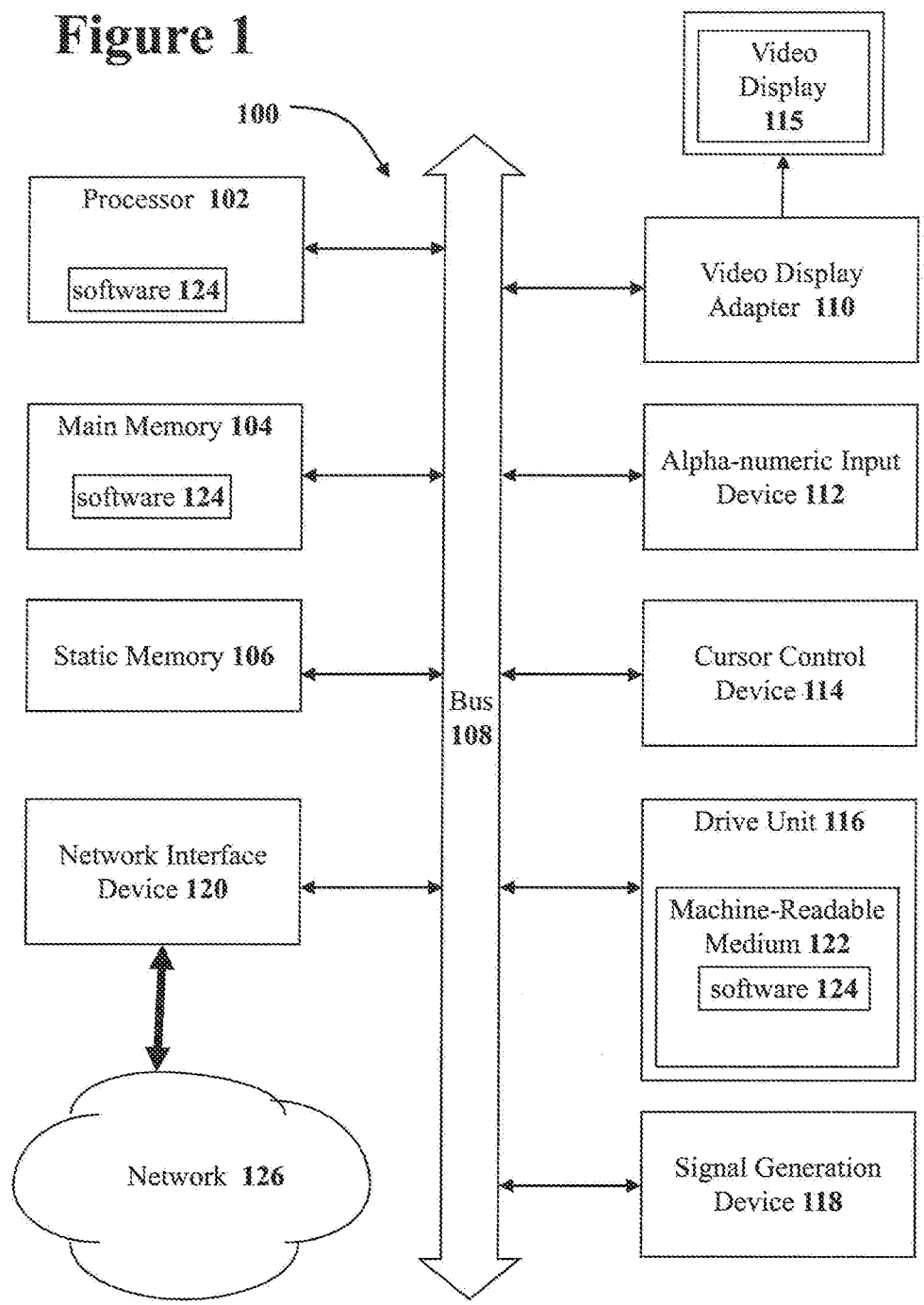
FIG. 1 illustrates a diagrammatic representation of machine in the example form of a computer system within which a set of instructions, for causing the machine to perform any one or more of the methodologies discussed herein, may be executed.

FIG. 1 illustrates a diagrammatic representation of a machine in the example form of a computer system 100 within which a set of instructions 124, for causing the machine to perform any one or more of the methodologies discussed herein, may be executed. In alternative embodiments, the machine may operate as a standalone device or may be connected (e.g., networked) to other machines. In a networked deployment, the machine may operate in the capacity of a server or a client machine in server-client network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a network server, a network router, a network switch, a network bridge, or any machine capable of executing a set of instructions (sequential or otherwise) that specify actions to be taken by that machine. Further, while only a single machine is illustrated in FIG. 1, the term "machine" shall also be taken to include any collection of machines that individually or jointly execute a set (or multiple sets) of instructions to perform any one or more of the methodologies discussed herein.

The example computer system 100 illustrated in FIG. 1 includes a processor 102 (e.g., a central processing unit (CPU), a graphics processing unit (GPU) or both), a main memory 104, a static memory 106, which may communicate with each other via a bus 108. The computer system 100 may further include a video display adapter 110 that drives a video display system 115 such as a Liquid Crystal Display (LCD) or a Cathode Ray Tube (CRT). The example computer system 100 also includes an alphanumeric input device 112 (e.g., a keyboard), a cursor control device 114 (e.g., a mouse or trackball), a disk drive unit 116, a signal generation device 118 (e.g., a speaker), and a network interface device 120. Note that various embodiments of a computer system will not always include all of these peripheral devices.

The disk drive unit 116 includes a machine-readable medium 122 on which is stored one or more sets of computer instructions and data structures (e.g., instructions 124 also known as 'software') embodying or utilized by any one or more of the methodologies or functions described herein. The instructions 124 may also reside, completely or at least partially, within the main memory 104 and/or within the processor 102 during execution thereof by the computer system 100, the main memory 104 and the processor 102 also constituting machine-readable media.

The instructions 124 for operating computer system 100 may be transmitted or received over a network 126 via the network interface device 120 utilizing any one of a number of well-known transfer protocols such as the File Transfer Protocol (FTP).

While the machine-readable medium 122 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies described herein, or that is capable of storing, encoding or carrying data structures utilized by or associated with such a set of instructions. The term "machine-readable medium" shall accordingly be taken to include, but not be limited to, solid-state memories, optical media, flash memory, magnetic media, and carrier wave signals.

For the purposes of this specification, the term "module" includes an identifiable portion of computer code, computational or executable instructions, data, or computational object to achieve a particular function, operation, processing, or procedure. A module need not be implemented in software; a module may be implemented in software, hardware/circuitry, or a combination of software and hardware.

Search Engines

Search engines are computer programs that are designed to allow a computer user to search a particular domain of information. A search engine typically allows a computer user to enter a set of search keywords and then the search engine generates a set of search results from the search domain that contain the user-specified keywords.

Very popular forms of search engine are the World Wide Web search engines that are available on the global Internet. A World Wide Web search engine allows a web user to enter a set of search keywords and then the World Wide Web search engine returns a search result set World Wide Web pages that contain the user-specified search keywords.

World Wide Web search engines typically operate by having an automated program that learns about new web pages (commonly known as a "web crawler") visit World Wide Web pages to continually learn about the content that is available on the World Wide Web. The information obtained by the automated web crawler program is used to create a searchable index of all the web pages that were visited by the automated web crawler program. That searchable index is used by the Internet search engine to generate search results for search requests from Internet users.

Determining Relevancy for Search Engines

When a user enters a set of keywords into a search engine, the search engine returns a set of results that contain the keywords entered by the user. For most queries entered by Internet users into an Internet search engine, the keywords entered will often match thousands or even hundreds of thousands of web sites. Search engines that simply return such a massive set of results with hundreds of thousands of web sites simply are not very useful.

A massive information overload is not the result desired by an internet user that simply wishes to locate a good web site with information about the keywords that have been entered into the search engine. Instead, the Internet user would prefer to obtain good search results that are highly relevant to what Internet user is really interested in. Thus, the real key to building a good search engine is to score the search results by some type of relevancy measure and present the results deemed to be most relevant at the top of the search results list. Thus, a goal of relevancy systems is to infer the actual intent of the Internet user requesting an Internet search in order to identify results that best fulfill the intent of the user.

Many Internet search engines have implemented various versions of such relevancy scoring systems in order to improve the quality of the search results provided by those Internet search engines. In one well-known relevancy determination system for World Wide Web sites, each web site is assigned a relevancy score that is dependent upon the number of external hyperlinks that point to that web site. Thus, the more other web sites point to a particular web site, the more relevant that particular web site is deemed to be. In effect, each hyperlink to a web site acts as a popularity "vote" for that web site within the relevancy scoring system. The matching web sites that receive the most such votes will be placed at or near the top of the search results.

One disadvantage of such relevancy systems is that once the system used to calculate the relevancy score becomes widely known, that relevancy system becomes subject to abuse by people wishing to artificially raise the profile of their web sites. For example, if a particular commercial web site wishes to generate a lot of traffic for its web site, then that web site may create many external web sites that link to the main commercial web site. In this manner, the relevancy scoring system of the Internet search engine may be tricked into ranking that commercial site highly despite the fact that the same entity created all those multiple links to the main web site.

Relevancy for Dynamic Data Sets

As set forth in the previous section, one possible method for determining the relevancy of items is a data set is to use some known indicator as to the relative popularity of the items within that data set. Within the context of searching Internet web sites, the relative popularity of a particular web site may be inferred from how many other web sites link to that particular web site. Thus, the number of links to a particular web site may be used as part of a relevancy score within an Internet search engine.

However, in a very dynamic data domain wherein the items in the domain are changing all of the time, such relatively static indications of popularity are not very useful for determining relevancy. For example, in an online marketplace that continually presents new items available for sale, the set of items in the search domain (the items currently available for sale) is continually changing as items are sold and new items are offered for sale. Thus the items available for sale represent a "dynamic data domain". Any links to web pages associated with the items for sale are relatively useless since the items will often be sold before many links are ever made to the web pages associated with items for sale. Thus, other methods are needed to create relevancy scores for a dynamic data domain.

Since the items in a dynamic data domain are continually changing, any information connected directly to a specific item in the dynamic domain (such as a link to a web page for an item currently in the data domain) is not useful for generally determining relevancy since that specific item may soon be gone. Instead, factors that describe a particular popular item in the data domain (and thus can also be used to describe other similar items) are useful for relevancy.

Furthermore, since the goal is to determine the intent of a user that is searching a dynamic data domain, any measure of relevancy would ideally be correlated to the actual search request made by that user. To meet these goals, a system has been devised that generates relevancy rankings based upon user item selections that are made after a set of search result items has been presented to the user in response to the user's search request.

In the disclosed dynamic data domain relevancy system, the system responds to a user search request with a set of items that fulfil the requirements of the user's search request. The items are normally then displayed in list form with limited additional information. The user may then select any item presented in the search results in order to obtain more information on that selected item. This selection of an item in the search results by the user acts as a popularity vote for that particular item within the context of the user's original search. Note that to be useful for future relevancy determinations; some descriptive factor of the selected item must be abstracted out from the user's selection in order to use that descriptive factor for future relevancy determinations. In this manner, when a relevancy determination must be performed for the same search request but that selected item no longer exists, similar items may be identified in the dynamic data domain with a high relevancy using the descriptive factor that was abstracted out of the selected item.

In one embodiment, the descriptive factors that may be used to identify similar relevant items in the future are additional words in a descriptive field for an item that were not part of the user's original search query keywords. Thus, if a user enters a particular search query and then selects a set of items that all contain a description field with a particular word that was not in the original search query, then having that particular word may raise the relevancy of items for that particular search query. Similarly, if a set of items in the query results all share a particular word but none of those items was selected by the user then having that particular word may lower the relevancy score for items for that search query. Note that other factors may be used and this is just one example of a descriptive factor that may be used to identify similar items in the future.

For example, a user that wishes to purchase a portable digital music player may enter the search query "ipod nano" in a search engine for an online marketplace. In response to the "ipod nano" search query into the online marketplace, the system may present the items with a description field that is listed in the left column. The center column contains the various words from the description field after removing the original search query ("ipod nano") and common stop words (and, or, in, the, for, etc.).

TABLE 1

Possible search query results for "ipod nano" search query

| Reults to Query: "ipod nano" | Extra terms | Item selected: ? |
|---|---|---|
| Sealed 4 Gb Ipod Nano | Sealed, 4 Gb | Yes |
| iPod Nano black | black | No |
| iPod Nano leather skin | Leather, skin | No |
| iPod nano FM transmitter | FM, transmitter | No |
| iPod Nano sealed | sealed | Yes |
| scratched white iPod Nano | Scratched, white | No |
| iPod Nano transmitter for car | Transmitter, car | No |
| New ipod Nano 8 GB black | 8 GB, black | Yes |
| new 4 GB white ipod nano | New, 4 GB, white | Yes |
| New leather ipod nano case | New, leather, case | No |

A user that is interested in purchasing a new iPod Nano device may click on the entries for "sealed 4 Gb Ipod Nano", "iPod Nano sealed", and "New ipod Nano 8 GB black", and "new 4 GB white ipod nano". Thus, in future searches for "ipod nano", the items that include the extra terms that were selected by the user should receive an increased relevancy score. One method of performing this is to assign a relevancy adjustment factor to each possible extra word. That relevancy adjustment factor associated with an extra word will adjust the relevancy score for items that have a description with that extra word. When a user selects an item, the relevancy adjustment factors for the extra words associated with that selected item will be increased. Thus, the extra terms associated with the four items selected (sealed, 4 Gb, sealed, new, 8 GB, black, new, 4 GB) should have their relevancy adjustment factors increased. Note that the extra words may be listed more than once since those terms existed in more than one item selected by the user.

As a corollary, extra words from item descriptions that were not selected may have their relevancy adjustment scores decreased. In one embodiment, such terms must not be in any selected item and must appear in more than one non-selected item. In such an embodiment, the terms "transmitter" and "leather" may have their adjustment relevancy scores decreased.

Determining Relevancy Adjustment Factors

Figure 2:
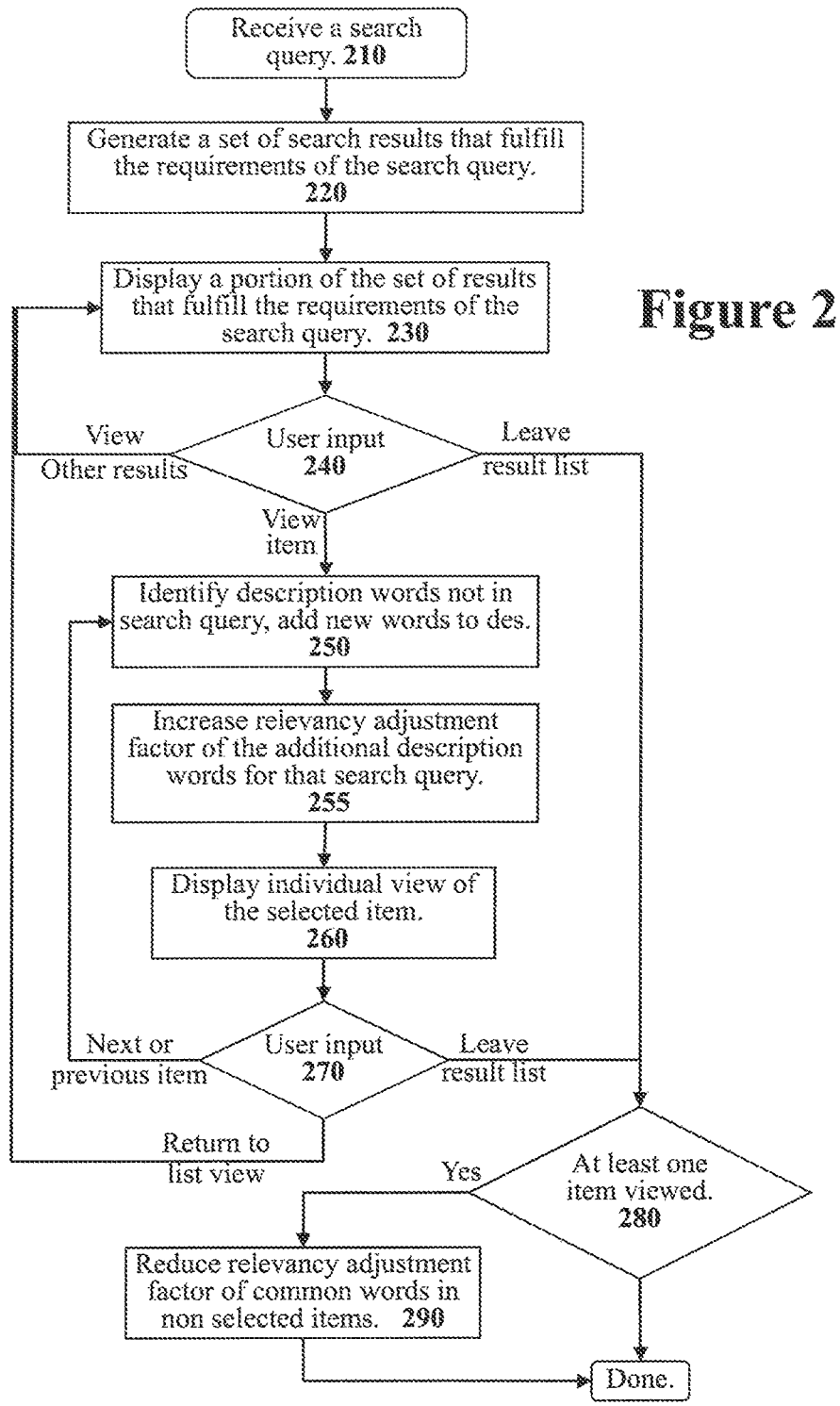
FIG. 2 illustrates a high level flow chart describing how one embodiment can modify a relevancy adjustment factor in response to user selections.
Figure 3:
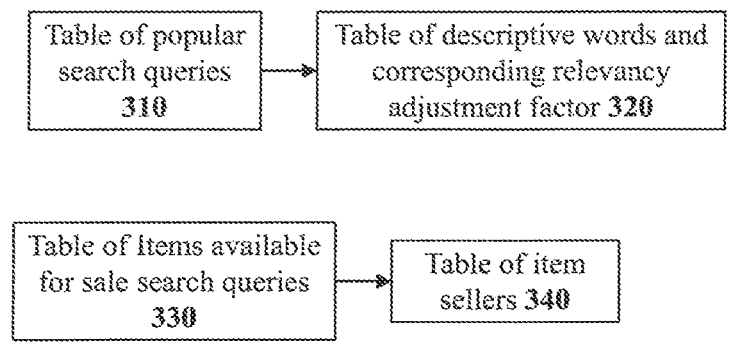
FIG. 3 illustrates some database tables that may be used in various embodiments of the invention.

FIG. 2 illustrates a high level flow chart describing how one possible embodiment could operate to modify the relevancy adjustment factors of extra words in the description. The initial relevancy adjustment factor for extra words can be set to a neutral value such as one ("1"), FIG. 3 illustrates some database tables 310, 320, 330, and 340 that may be used in various embodiments of the invention.

Referring to the top of FIG. 2, the system first receives a search query at stage 210. Next, at stage 220, the system creates a set of search results fulfil the requirements of the user's search query from stage 210. Note that this set of search results may be sorted by relevancy as will be described later.

At stage 230, the system displays a portion of results to the user. In an internet marketplace embodiment, the results may comprise a set of items available for sale. At stage 240, view another portion of the search results, the user may select items to view in greater detail, or leave this set of results. If the user decides to view another portion of the search results then the system selects another portion of the search results to display and returns to stage 230 to display those results.

If the user decides to view an item from the search results in greater detail, the system proceeds to stage 250. Since the user selected the item, this item is deemed to be relevant to people who entered the particular search query that was entered back at stage 210. Thus, the system will increase the relevancy adjustment factor of descriptive factors related to this selected item for this particular search query.

As set forth earlier, one embodiment uses the additional words in a descriptive field for the item that were not part of the search query as a descriptive factor that can be used to identify similar items in the future. Thus, at stage 250, the system identifies words from a description field that were not part of search query (if any) and adds these additional descriptive words to a database table 320 associated with a search query entry in a table of popular search queries 310 if these additional words are not already in the additional descriptive words database table 320.

Next, at stage 255, the system increases the relevancy adjustment factor for the additional descriptive words that were identified in the previous stage. The relevancy adjustment factor may be kept in the same database table 320 as the additional descriptive words. Not that relevancy adjustment factor for each word is done on per search query basis since relevancy of a descriptive word will vary heavily depending on the item. For example, the word "Persian" may be very relevant for rugs but completely irrelevant for iPods.

After modifying the relevancy adjustment factor of the additional words for the selected item, the system displays the selected item to the user in greater detail at stage 260. Additional processing will depend on user input at stage 270. If the user requests to see the next or previous item then the system will obtain the information associated with that item and return to step 250 to handle the appropriate relevancy adjustment factor modifications and display of that item. If the user decides to return to the list view of the search results then the system returns to stage 230 to display the search results in the list view.

If the user decides to leave this particular search query at stage 270 (or leaves this search query at earlier stage 240) then the system may determine if any relevancy adjustment factor decreases should be made. At stage 280, the system first determines if at least one item was viewed. If no item was viewed then no relevancy adjustment factor changes may be made since there is insufficient information on whether the user was really interested or disinterested in the displayed items. If at least one item was viewed then the system may proceed to step 290 to possibly reduce one or more relevancy adjustment factors associated with items that were not selected. The system will identify common additional descriptive words that exist in the non selected items. In one embodiment, the system requires that a descriptive word not be in any of the selected items and be in at least two items that were presented to the user but not selected by the user before reducing the relevancy adjustment factor of that descriptive word. Descriptive words that pass this test may have their relevancy adjustment factors reduced. Note that not all relevancy system embodiments will implement the relevancy adjustment factor reduction system disclosed with reference to stages 680 and 690.

Using Relevancy Adjustment Factors

Figure 4:
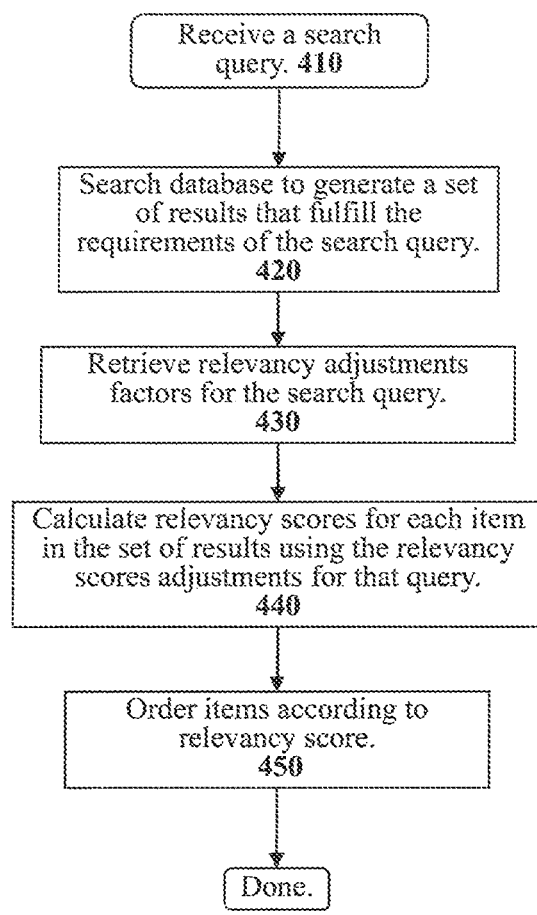
FIG. 4 illustrates a high level flow chart describing how the relevancy adjustment factors created in the system of FIG. 2 may be used to adjust relevancy scores for items in a search result set.

FIG. 4 illustrates a high level flow chart describing how one possible embodiment could use the relevancy adjustment factors created in the system of FIG. 2 to adjust relevancy scores for items in a search result set. Note that the system illustrated in FIG. 4 could be used within stage 220 of the system in FIG. 2.

Initially, a search query is received at step 410. Then at stage 420, the system then searches the item database to generate an initial set of results that fulfil the requirements of the search query entered at stage 410.

After obtaining the initial search result, the search results must be sorted by relevancy. To achieve this goal, the system retrieves the relevancy adjustment factors for the additional descriptive words in the items in the initial result at stage 430.

Next, at stage 440, the relevancy adjustment factors are applied to relevancy adjustment scores given to each item in the initial search result. In one embodiment, the relevancy adjustment factor may be multiplied against an initial relevancy score given to an item in a set of search query results to adjust the relevancy score of the item. Table 2 lists one possible set of relevancy adjustment factors for such an embodiment wherein some extra words associated with an "ipod nano" search query are listed. The relevancy adjustment factors for the extra words may be normalized to stay within a defined range. For example, the set of relevancy adjustment factors have been normalized to stay within the range of zero to two.

TABLE 2

"ipod nano" search query relevancy adjustment factor

| Extra Description Words | Relevancy adjustment factor |
| --- | --- |
| Sealed | 1.5 |
| black | 0.8 |
| leather | 0.4 |
| transmitter | 0.32 |
| white | 0.74 |
| 4 GB | 0.9 |
| case | 0.37 |
| 2 GB | 0.6 |
| 8 GB | 1.2 |
| new | 1.3 |

To apply the relevancy adjustment factors given in Table 2 the relevancy adjustment factors are multiplied against an initial relevancy score given to an item if that item has the associated extra word in its description. Thus, referring to Table 2, items in a result set for an "ipod nano" search query with highly relevant additional descriptive words such as "sealed", "8 GB", and "new" will increase the relevancy score for those items. Similarly, items in a result set for an "ipod nano" search query with largely irrelevant additional descriptive words such as "leather", "transmitter", or "case" will reduce the relevancy score for those items. Many other method of using the relevancy adjustment factor to modify an initial relevancy score may be used.

In an alternate embodiment, the relevancy adjustment factor may be added to an initial relevancy score for an item to adjust the item's relevancy score. Table 3 lists one possible set of relevancy adjustment factors for such an embodiment wherein some extra words associated with an "ipod nano" search query are listed. The relevancy adjustment factors for the extra words may be normalized to stay within a defined range such as −100 to 100.

TABLE 3

"ipod nano" search query relevancy adjustment factor

| Extra Description Words | Relevancy adjustment factor |
|---|---|
| Sealed | 73 |
| black | −4 |
| leather | −70 |
| transmitter | −83 |
| white | 2 |
| 4 GB | −3 |
| case | −80 |
| 2 GB | −3 |
| 8 GB | 25 |
| new | 82 |

Note that in Table 3, the highly desirable terms ("sealed", "8 GB", and "new") have large positive relevancy adjustment factors. Similarly, the undesirable terms ("transmitter", "leather", and "case") have large negative scores. The remaining neutral terms will have relatively little effect on the relevancy score.

After adjusting an initial set of relevancy scores, the items are then ordered according to the adjusted relevancy score at stage 450. The relevancy sorted set of items may then be presented to the user. Since the result set has been sorted with items similar to previously selected items from earlier searches with the same query placed at the top, the user should quickly be able to find a desired item quickly.

Preventing Abuse of a Relevancy Systems for Dynamic Data Sets

As set forth in the discussion on Internet search engines that rely upon hyperlinks to a web site as a measure of that web site's popularity, such Internet search engines can be abused by people that create thousands of unrelated web sites that link to a specific web site. This multitude of links to a specific web site will create a false appearance of popularity of that specific web site. Similar methods of abuse may be attempted on the dynamic data set relevancy system disclosed in the previous sections.

For example, very aggressive sellers on an internet marketplace may attempt to create automated programs that repeatedly select the items that such aggressive sellers have posted for sale on the internet marketplace. In this manner, such aggressive sellers may be attempting to make the items that such aggressive sellers post onto the internet marketplace look popular such that those items will receive an increased relevancy score.

Figure 5:
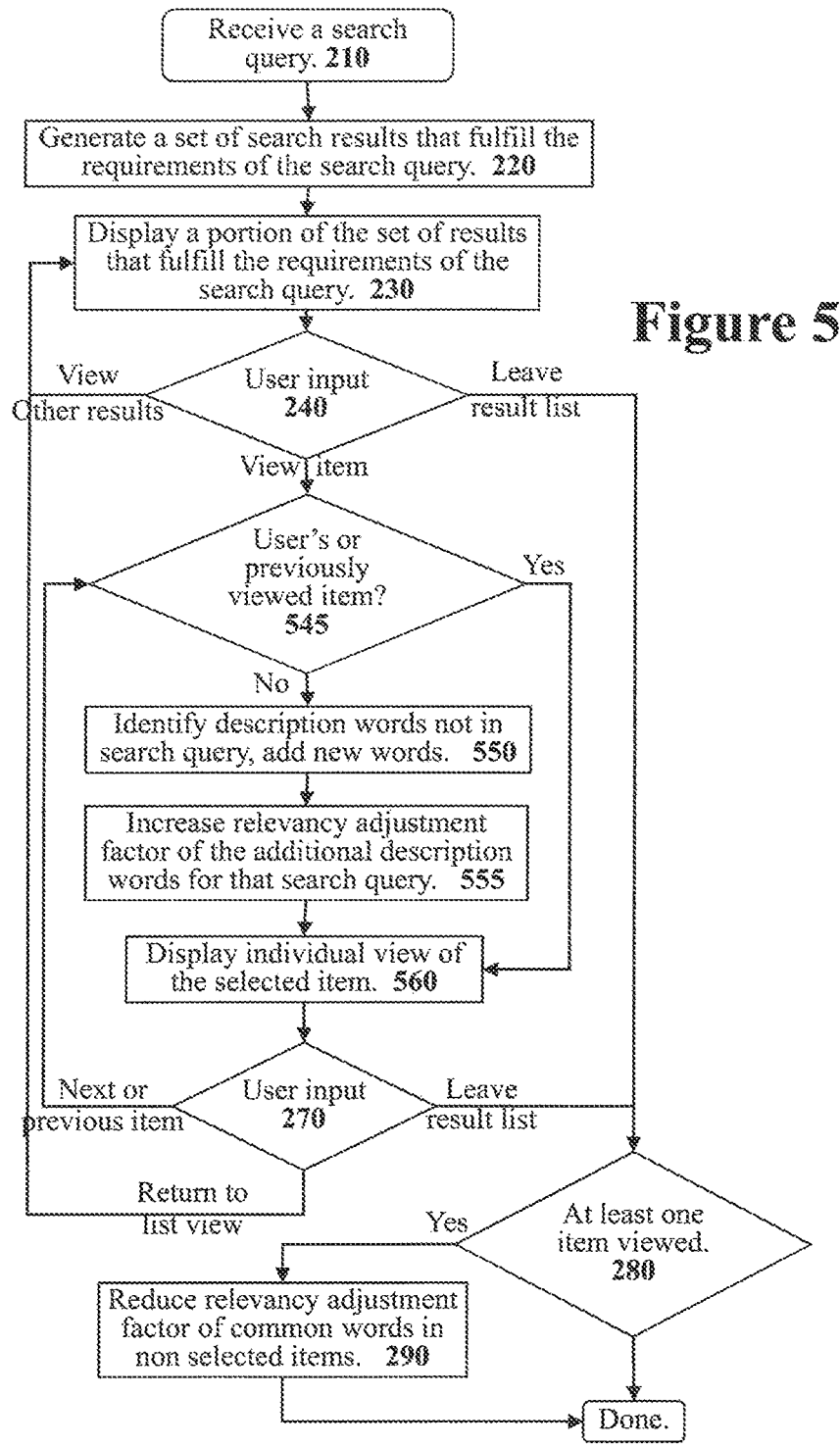
FIG. 5 illustrates the relevancy adjustment factor system disclosed in FIG. 2 with an added step to prevent abuse by aggressive users that click on their own items.

To prevent such abuse, a set of various different restraints may be imposed on the relevancy scoring system to stop users from abusing the relevancy scoring system. A first restraint that may be implemented for preventing such abuse may be directed to prevent the exact scenario described in the previous paragraph. FIG. 5 illustrates the relevancy adjustment factor system disclosed in FIG. 2 but with an added step to prevent abuse by aggressive sellers that click on their own items posted for sale.

Referring to FIG. 5, stage 545 has been added after a user selects an item for viewing in greater detail. At stage 545, the system determines if the selected item is an item that was posted by this particular user or if this user has already viewed this particular item. If either case is true, then the system skips the relevancy adjustment factor modification stages 550 and 555 and instead goes directly to stage 560 where the system displays the item to the user. In this manner, the system prevents a user from repeatedly selecting his own item. Furthermore, stage 545 prevents a user from creating a second account and then repeatedly selecting his own item from that second account.

Preventing abuse of a Relevancy systems with User Reputation Scores

In internet marketplace systems, it is common to have a reputation score for buyers and sellers that participate in the internet marketplace such that people have some sort of measure as to whether the other party in a potential transaction should be trusted or not. These reputation scores are generally created by having users provide feedback on the other party in a transaction on the internet marketplace after that transaction is completed (or is otherwise ended). In one embodiment of the disclosed system, such a user reputation score has been incorporated into the relevancy system. Incorporating user reputation scores into a relevancy system improves the results of the relevancy system and reduces the possibility of abuse of the relevancy system.

Figure 6:
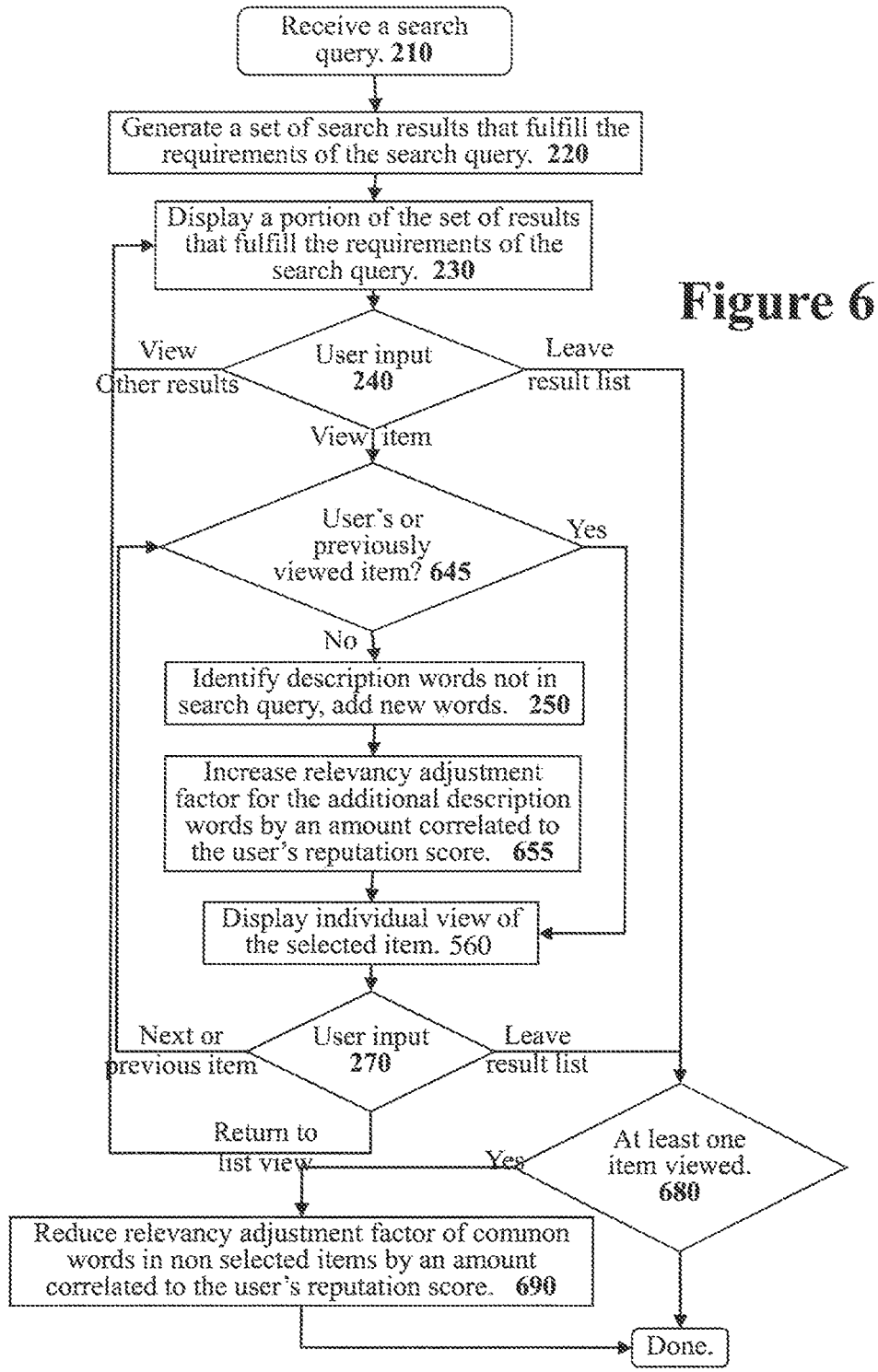
FIG. 6 illustrates a relevancy score adjustment system of FIG. 5 wherein a reputation score associated with each user is used to make adjustments that are correlated to the reputation score.

FIG. 6 illustrates a relevancy score adjustment system for dynamic data sets wherein a reputation score associated with each user has been incorporated into the relevancy system. The system of FIG. 6 is the same as the system of FIG. 5 except that the user's reputation is taken in consideration when making changes to the relevancy adjustment factors. Specifically, stage 655 has been changed to indicate that the system increases the relevancy adjustment factor by an amount correlated to the user's reputation score. Similarly, stage 690 has been changed to indicate that the system reduces the relevancy adjustment factor by an amount correlated to the user's reputation score.

Incorporating user reputation scores into the relevancy system provides a number of significant advantages to the relevancy system. One advantage is that changes made to the relevancy adjustment factors may be made manner that is correlated to the user's skill. An experienced user will have a higher reputation score such that selections by that experienced user will change the relevancy system more than a novice user.

Another advantage is that incorporating user reputation scores into the relevancy system can be used to prevent abuse of the relevancy system. Specifically, an aggressive seller may attempt to thwart the restriction set forth in stage 645 that only allows one selection of an item by a particular user to adjust that item by creating a large number of new accounts and selecting the user's item from each of those new accounts. By setting the reputation score of new accounts to be zero or another low value, the selections made by such new accounts will have no or very little effect on the relevancy system. Thus, the creation of a large number of new accounts cannot be used to abuse the relevancy system.

In one embodiment, the users may have different reputation scores for different categories of products available at an internet marketplace. Thus, a person may have a high reputation for buying and selling electronics but only a very novice reputation for buying and selling housewares. In such an embodiment the system would identify the category of product searched and use the user's reputation in that category when making changes to relevancy adjustment factors. In this manner, the system factors in a person's specific skill set such that their selections in their categories of high reputation will have significant effects on the relevancy system but their selections in other areas will not have significant effects on the relevancy system. Note that this will require a user to participate in a number of successful transactions before that user's selections have a significant effect on the relevancy. This helps prevent a person from attempting to create many accounts that participate in one transaction each and then using those many accounts to abuse the relevancy system.

Integration with Other Relevancy Systems

The relevancy system for dynamic data sets that has been disclosed may be integrated with other relevancy systems that are based on other factors. For example, an alternate system may use the reputation of sellers when determining relevancy such that sellers with higher reputations receive higher relevancy scores than sellers with low reputations. In such a system, buyers will be presented with more reliable sellers at the top of the search results. The presented relevancy system for dynamic data sets could be combined with such a system (or multiple other relevancy systems) such that a combined relevance score is used to present search results.

Although the relevancy system has largely been disclosed with reference to an internet marketplace embodiment, it must be stressed that the relevancy system can be used in many other embodiments. In other embodiments, the user reputation score may be replace with another similar measure of a user's experience with a system. For example, in an embodiment for a message posting board the user reputation score may be replaced with a number of postings made by that user. Furthermore, the invention has been described with a descriptive factor of other words in description field item but any other descriptive factor than can be used to identify similar items in the future can be used.

The preceding description is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended, that is, a system, device, article, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

The Abstract is provided to comply with 37 C.F.R. §1.72 (b), which requires that it allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description, with each claim standing on its own as a separate embodiment.

What is claimed is:

1. A method comprising:
 receiving a submission of a search query, the search query including a set of keywords;
 generating a set of search result items corresponding to the search query;
 ranking the set of search result items based on a set of relevancy scores associated with the set of search result items, each of the set of relevancy scores based on a set of relevancy adjustment factors corresponding to a set of additional keywords, the set of additional keywords associated with a search result item of the set of search result items but not included in the search query, the set of relevancy adjustment factors representing a relevancy of each of the set of additional keywords to the search query;
 detecting a selection of the search result item from the set of search result items;
 based on the detecting of the selection of the item, determining an amount by which to increase at least one of the set of relevancy adjustment factors based on a reputation score associated with a user who performed the selection of the search result item and increasing the at least one of the set of relevancy adjustment factors by the amount;
 receiving an additional submission of the search query;
 generating an additional set of search result items corresponding to the search query; and
 ranking the additional set of search result items, the ranking of the additional set of search result items reflecting the increasing of the at least one of the set of relevancy adjustment factors corresponding to the at least one of the set of additional keywords, the ranking of the additional set of search results items being performed by one or more processors.

2. The method of claim 1, further comprising determining the set of additional keywords based on an analysis of a description corresponding to the search result item.

3. The method of claim 1, further comprising selecting the reputation score from a plurality of reputation scores associated with the user based on an expertise of the user with respect to a product category associated with the search query.

4. The method of claim 3, further comprising determining the expertise of the user with respect to the product category based on a number of transactions that the user has engaged in with respect to the product category.

5. The method of claim 1, further comprising determining the reputation score of the user based on feedback received about the user.

6. The method of claim 1, wherein the generating of the additional set of search result items includes identifying that the item no longer exists in a dynamic data domain and replacing the item with an additional item.

7. A system comprising:
 one or more modules implemented by one or more processors, the one or more modules configured to, at least:
 receive a submission of a search query, the search query including a set of keywords;
 generate a set of search result items corresponding to the search query;
 rank the set of search result items based on a set of relevancy scores associated with the set of search result items, each of the set of relevancy scores based on a set of relevancy adjustment factors corresponding to a set of additional keywords, the set of additional keywords associated with a search result item of the set of search result items but not included in the search query, the set of relevancy adjustment factors representing a relevancy of each of the set of additional keywords to the search query;
 detect a selection of the search result item from the set of search result items;
 based on the detecting of the selection of the item, determine an amount by which to increase at least one of the set of relevancy adjustment factors based on a reputation score associated with a user who performed the selection of the search result item and increasing the at least one of the set of relevancy adjustment factors by the amount;

receive an additional submission of the search query;

generate an additional set of search result items corresponding to the search query; and rank the additional set of search result items, the ranking of the additional set of search result items reflecting the increasing of the at least one of the set of relevancy adjustment factors corresponding to the at least one of the set of additional keywords.

8. The system of claim 7, the one or more modules further configured to, at least, determine the set of additional keywords based on an analysis of a description corresponding to the search result item.

9. The system of claim 7, the one or more modules further configured to, at least, select the reputation score from a plurality of reputation scores associated with the user based on an expertise of the user with respect to a product category associated with the search query.

10. The system of claim 9, the one or more modules further configured to determine the expertise of the user with respect to the product category based on a number of transactions that the user has engaged in with respect to the product category.

11. The system of claim 7, the one or more modules further configured to determine the reputation score of the user based on feedback received about the user.

12. The system of claim 7, wherein the generating of the additional set of search result items includes identifying that the item no longer exists in a dynamic data domain and replacing the item with an additional item.

13. A non-transitory machine-readable medium embodying a set of instructions that, when executed by a processor of a machine, cause the machine to perform operations comprising:

receiving a submission of a search query, the search query including a set of keywords;

generating a set of search result items corresponding to the search query;

ranking the set of search result items based on a set of relevancy scores associated with the set of search result items, each of the set of relevancy scores based on a set of relevancy adjustment factors corresponding to a set of additional keywords, the set of additional keywords associated with a search result item of the set of search result items but not included in the search query, the set of relevancy adjustment factors representing a relevancy of each of the set of additional keywords to the search query;

detecting a selection of the search result item from the set of search result items;

based on the detecting of the selection of the item, determining an amount by which to increase at least one of the set of relevancy adjustment factors based on a reputation score associated with a user who performed the selection of the search result item and increasing the at least one of the set of relevancy adjustment factors by the amount;

receiving an additional submission of the search query;

generating an additional set of search result items corresponding to the search query; and ranking the additional set of search result items, the ranking of the additional set of search result items reflecting the increasing of the at least one of the set of relevancy adjustment factors corresponding to the at least one of the set of additional keywords.

14. The non-transitory machine-readable medium of claim 13, the operations further comprising determining the set of additional keywords based on an analysis of descriptions corresponding to the search result item.

15. The non-transitory machine-readable medium of claim 13, the operations further comprising selecting the reputation score from a plurality of reputation scores associated with the user based on an expertise of the user with respect to a product category associated with the search query.

16. The non-transitory machine-readable medium of claim 15, the operations further comprising determining the expertise of the user with respect to the product category based on a number of transactions that the user has engaged in with respect to the product category.

17. The non-transitory machine-readable medium of claim 13, the operations further comprising determining the reputation score of the user based on feedback received about the user.

* * * * *